(12) United States Patent
Altekruse et al.

(10) Patent No.: US 8,188,708 B2
(45) Date of Patent: May 29, 2012

(54) BATTERY CHARGER WITH HIGH FREQUENCY TRANSFORMER

(75) Inventors: Kenneth Altekruse, Appleton, WI (US);
James D. Kimball, Appleton, WI (US);
Dennis Sigl, Greenville, WI (US);
Bernard J. Vogel, Troy, OH (US);
Jeffrey Lonigro, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 773 days.

(21) Appl. No.: 11/853,094

(22) Filed: Sep. 11, 2007

(65) Prior Publication Data
US 2009/0066290 A1 Mar. 12, 2009

(51) Int. Cl.
*H02J 7/00* (2006.01)
(52) U.S. Cl. .................. 320/108; 320/104; 320/107
(58) Field of Classification Search .............. 320/107, 320/108, 137, 104; 323/355; 363/64, 171
See application file for complete search history.

(56) References Cited

U.S. PATENT DOCUMENTS

| | | | |
|---|---|---|---|
| 5,170,336 A * | 12/1992 | Getter et al. | 363/141 |
| 5,548,200 A | 8/1996 | Nor et al. | |
| 6,495,992 B1 | 12/2002 | Pavlovic | |
| 6,611,189 B2 | 8/2003 | Sigl | |
| 6,803,746 B2 * | 10/2004 | Aker et al. | 320/139 |
| 6,864,777 B2 | 3/2005 | Sigl | |
| 2002/0140403 A1* | 10/2002 | Reddy | 320/162 |
| 2002/0175798 A1 | 11/2002 | Sigl | |
| 2007/0216377 A1* | 9/2007 | Yoshimura | 323/250 |

OTHER PUBLICATIONS

International Search Report; PCT/US2008/072762; 2 pages.

* cited by examiner

*Primary Examiner* — Edward Tso
*Assistant Examiner* — Aaron Piggush
(74) *Attorney, Agent, or Firm* — Quarles & Brady LLP

(57) ABSTRACT

A battery-charging system includes a power supply having a high-frequency transformer and is configured to deliver a battery charging power to charge at least one battery. The high-frequency transformer has a bobbin including an elongated top and bottom surfaces and first and second substantially semi-circular end surfaces connecting the top surface with the bottom surface to form an elongated first coil winding surface having a central axis. A first coil is wound around the first coil winding surface, and a second coil is magnetically coupled to the first coil and wound thereto.

20 Claims, 13 Drawing Sheets

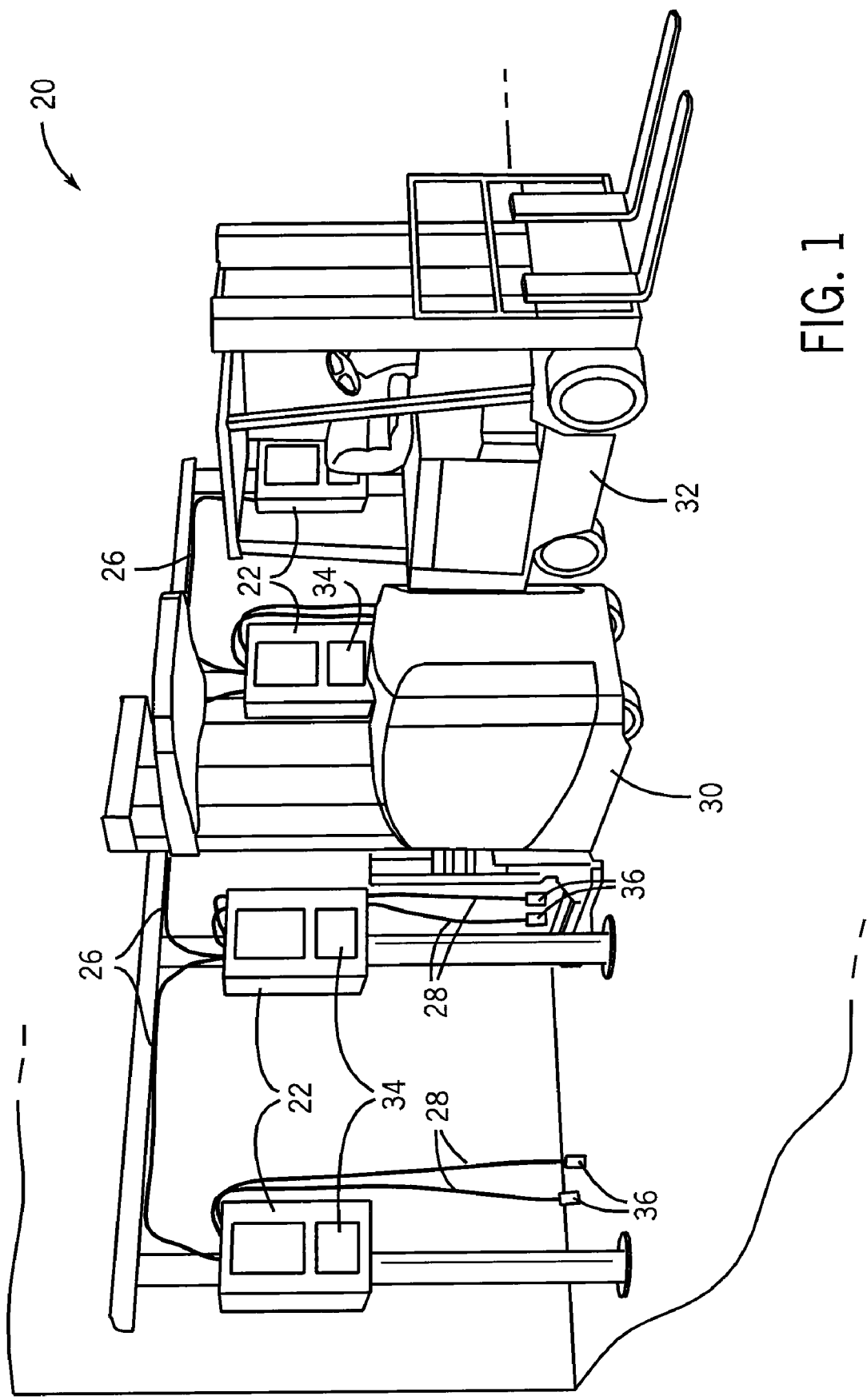

BATTERY CHARGER WITH HIGH FREQUENCY TRANSFORMER

REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention relates generally to battery charging systems and, more particularly, to high frequency transformers in industrial-type, fast charging, battery charging systems.

BACKGROUND OF THE INVENTION

Fast-charging, battery charging systems are distinguished from other battery charging systems in that they operate to produce a battery charging output with a higher kilowatt output and approximately twice, or greater, the charging rate than traditional battery charging systems. An industrial-type, fast charging, battery charging system can include a power supply connected to one or more charging stations, and the charging stations can have output currents up to 500 A or greater, and power outputs up to 30 kW and greater. Compatible battery voltages are typically 12 to 80 volts from a lead-acid battery or battery bank. The industrial-type, fast charging, battery chargers can typically be used for charging lift trucks, fork lifts, golf carts, and the like, which chargers operate at relatively higher electrical power levels to charge a 12-80 volts direct current (VDC) battery system. In these systems, the battery is the main power source for driving the fork lift, golf cart, and the like.

These fast charging systems can have a primary side switched-mode power supply that converts a mains alternating current (AC) electrical power into a suitable direct current (DC) electrical power. In general terms, the fast-charging, battery charger, power supply can include input terminals for mains input, and an input rectifier and filter for filtering and rectifying the mains input, an inverter for converting the rectified input power to a higher frequency, a high frequency transformer which converts the voltage up or down to the required output level on its secondary winding(s), and another rectifier and/or filter to provide a suitable DC battery charging power. Mains power can be 120, 240, 480, 600, or higher, VAC, and single phase or multiphase being typical for the higher voltages. A switched-mode power supply has the advantage of providing a relatively high frequency to the transformer, which allows the transformer to be smaller for a given current capacity, as transformer size is inversely related to operating frequency.

Consequently, high frequency transformers operating at high voltages and high currents are commonly used in battery-charger power supplies. The output stage of a battery-charger power supply, for example, may include an electrical transformer to transform the high bus voltage of the battery-charger power supply into a high current charging output. Transformer primary coil voltages on the order of 465 volts at 20 to 100 Khz and secondary coil currents on the order of 400 amps can be typical, but other voltages and frequencies are possible. As such, battery charger power supply transformer coils (e.g., primary and secondary coils) are made from large diameter wires (3-14 gauge wire is typical) in order to handle the currents generated by these large voltages.

Most of these transformers include a central bobbin having a coil winding window disposed about a central opening in the bobbin. The central opening is provided to receive one or more laminated or ferrite magnetic cores. Standard off-the-shelf magnetic cores are available in a wide variety of sizes and shapes, many of which have square or rectangular cross-sections. The coil windings typically also have rectangular or square cross sections wound close to the magnetic cores. This is because it is generally desirable to keep the coil windings close to the magnetic core to maximize the magnetic coupling between the magnetic core and the coil windings.

Having coil windings with rectangular or square cross sections can be problematic in charging applications however. This is because the large diameter wires used in battery-charger power supply transformers have a tendency to deform or bulge at locations where the winding direction changes quickly (e.g., at the corners when wound around a bobbin having a square or rectangular cross section). This is especially true for Litz wire, a stranded woven type of wire used extensively in high frequency (e.g., 20 Khz to 100 khz) battery charger power supply transformers. The outer insulation that is placed over these large wires can also bulge and deform.

The width of the overall coil winding in the area of the deformations tends to be wider than the width of the remaining portion of the coil because of the bulging wires. As a result, the coil may not fit within the winding window of the bobbin in those areas. At the very least, extra manufacturing steps, typically manual, must be taken during the coil winding process to properly fit the deformed coil into the winding window in the vicinity of the bulges or deformations. It is desirable, therefore, to have a bobbin winding window cross section that does not have quick changes in winding direction. Preferably, the central opening in the bobbin will still accommodate standard size, readily available, magnetic cores having rectangular or square cross sections.

Another problem with using large diameter wires in battery-charger power supply transformers is that the wire leads to and from these transformers tend to be less flexible than smaller wire leads. Extra space has typically been available inside of the battery-charger, power supply chassis around these transformers to allow the high-voltage and high-current transformer leads to be safely routed and connected to the rest of the battery-charger power supply.

The current trend in designing battery-charger power supplies, however, is to make these devices smaller. One way to accomplish this is to pack the various power supply components closer together inside of the chassis. As a result, other power supply components are placed closer to the high-voltage, high-current transformers in these designs. Thus, less room is provided to safely route the leads from the transformer to the rest of the power supply.

It is desirable, therefore, to have a battery-charger, power supply transformer wherein the leads exit the transformer in a known and repeatable manner. Preferably, the transformer structures will have smooth edges and surfaces in the vicinity where the leads exit the transformer to prevent damage to the transformer leads.

Another problem with battery-charger, power supply transformers, especially battery-charger, power supply transformers operating at high frequencies, is leakage inductance. The presence of high leakage inductance in these transformers can cause several problems. A leaky output transformer can reduce the output power of the battery charger power supply. The primary and secondary coils in leaky transformers are more susceptible to overheating. Finally, the energy stored in the leakage inductance can be detrimental to transistor switching circuits in the battery-charger power supply. Release of this stored energy can cause ringing, transistor failure and timing issues. Reducing or minimizing the leakage inductance in battery-charger, power supply, transformers is therefore generally desirable.

Leakage inductance results from primary coil flux that does not link to the secondary coil. The amount of primary coil flux linked to the secondary coil is dependent on the physical orientation and location of the primary and secondary coils with respect to each other. Reducing or minimizing the mean distance between the turns of the primary coil and the turns of the secondary coil will typically reduce or minimize leakage inductance in a transformer. Reducing or minimizing the mean length of the turns in a coil will also typically reduce or minimize leakage inductance.

It is desirable, therefore, to reduce or minimize the mean distance between the turns of the primary coil and the turns of the secondary coil in battery charger power supply transformers. Preferably, the mean length of the turns in the coils of the transformer will also be reduced or minimized.

SUMMARY OF THE INVENTION

The invention comprises, in one form thereof, a battery-charging system that includes a power supply having a high-frequency transformer and configured to deliver a battery-charging power to charge at least one battery. The high-frequency transformer has a bobbin including an elongated top and bottom surfaces and first and second substantially semi-circular end surfaces connecting the top surface with the bottom surface to form an elongated first coil winding surface having a central axis. A first coil is wound around the first coil winding surface, and a second coil is magnetically coupled to the first coil and wound thereto.

The invention comprises, in another form thereof, a power supply including a high-frequency transformer and configured to deliver a battery-charging power to charge at least one battery. The high-frequency transformer has a bobbin with a first coil winding surface, a first coil wound around the first coil winding surface, a second coil wound concentric to the first coil, and a cover, wherein the first coil and the second coil are compressed between the first coil winding surface and the cover.

The invention comprises, in yet another form thereof, a battery charging system which includes a power supply including a high-frequency transformer and configured to deliver a battery charging power to charge at least one battery. The high frequency transformer has a first coil, a second coil magnetically coupled to the first coil, the second coil including a plurality of second coil turns, and a plurality of locating spacers disposed to maintain a desired spacing between each of the plurality of second coil turns.

The invention comprises, in yet another form thereof, a method of manufacturing a battery charging system, where the method comprising the steps of: constructing a battery charging power supply including electrical connections for receiving a high-frequency transformer; forming a high-frequency transformer by: providing a first coil; winding a second coil concentric to the first coil; compressing the first coil and the second coil together to reduce the leakage inductance between the first coil and the second coil to a desired value; and mounting the high-frequency transformer to the battery charging power supply through the electrical connections.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective view of an embodiment of a battery charging system according to the present invention, shown with a lift truck and a forklift;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 4:
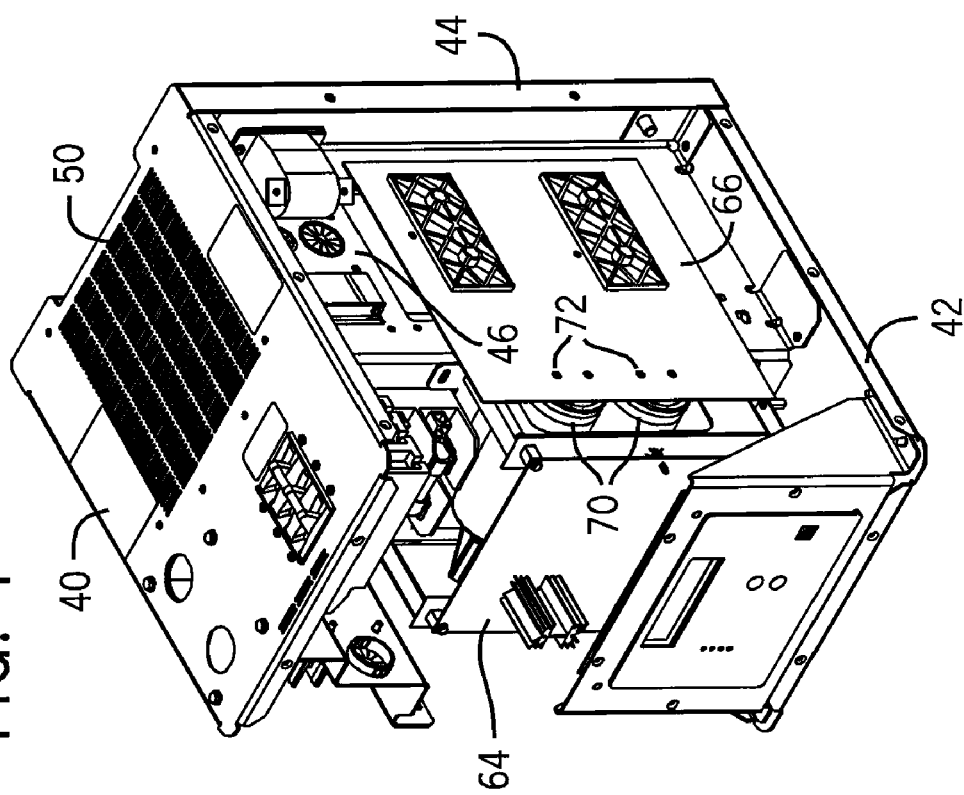
FIG. 4 is a perspective view of the power supply of FIG. 2 with the U-shaped cover component removed.

Referring now to the drawings, and more particularly to FIG. 1, a battery charging system 20 includes a plurality of battery-charging, power supplies 22 are interconnected via a series of cables 26 in daisy-chain configuration to share a common input power. While illustrated in a daisy-chain configuration, it is contemplated that the present invention may be utilized in stand-along, battery-charging, power supplies and non-daisy chained configuration. Extending from each battery-charging power supply 22 is a pair of battery-charging cables 28 designed to carry a battery-charging power (such as a DC current at an appropriate battery system voltage) for charging the battery systems of battery-powered systems, such as a lift truck 30, forklift 32, and/or other battery powered vehicles/systems. Battery charging system 20 can also include a battery module (not shown) which is carried by, and is connected to, the battery systems of vehicles 30, 32 and the like, and provides some control and monitoring to assess battery health and the charging process, charging and discharging history, and download capability for these parameters to provide fleet operations data.

Each battery-charging, power supply 22 may include a display 34 that may indicate charge level, charge time, charge voltage, and other relevant parameters of the charging process. Additionally, each battery-charging, power supply 22 may include on/off, and other, controls; short circuit, ground fault, and/or other electrical anomaly sensing circuits; feedback circuits providing feedback from the sensing circuits to the control circuits; bus circuits for receiving the high current signals; and other terminals, connectors, controls and circuits as are known.

Battery-charging cables 28 are designed connect each battery-charging, power supply 22 via connectors 36 to provide the battery charging power to charge the battery systems of vehicles 30, 32 and the like, or other battery powered systems. Connectors 36 are suitable for connection to the battery systems of vehicles 30, 32.

Figure 2:
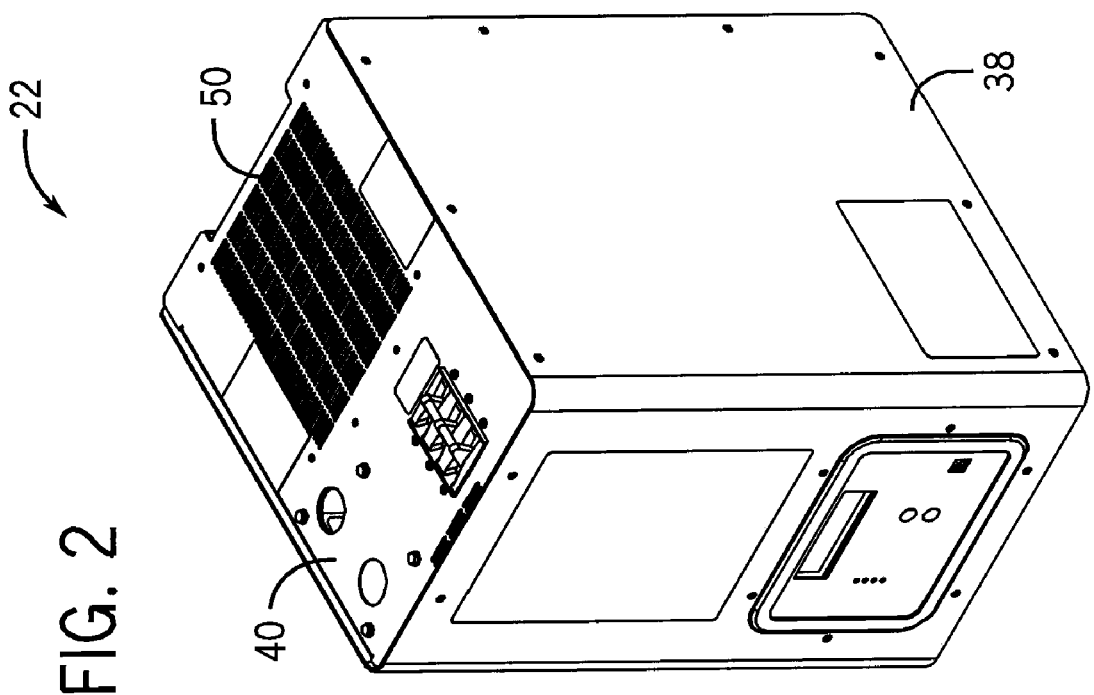
FIG. 2 is a perspective view of the power supply of the battery charging system of FIG. 1.
Figure 3:
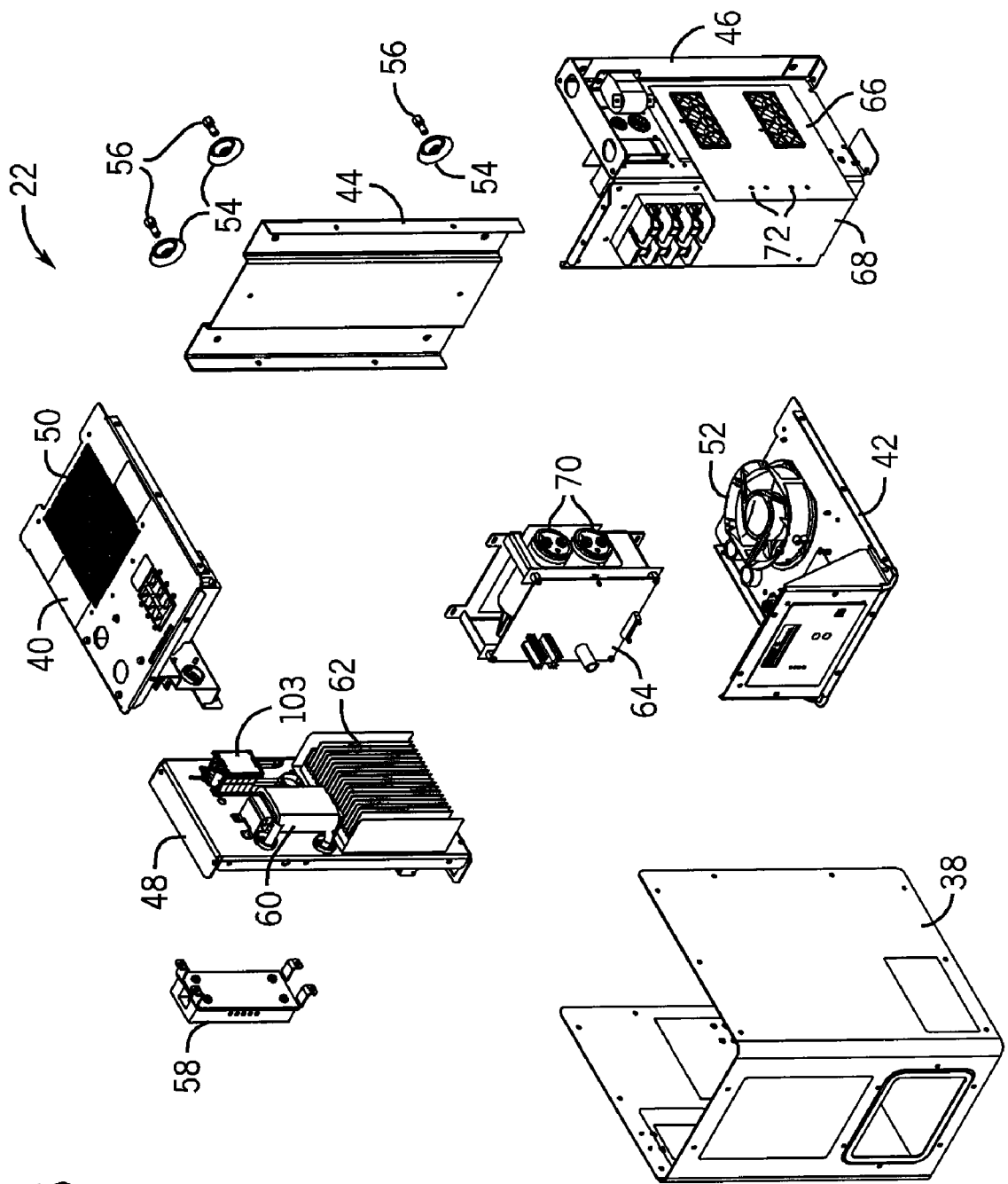
FIG. 3 is an exploded perspective view of the power supply of FIG. 2.

Referring now to FIGS. 2-4, battery-charging, power supply 22 can include a U-shaped cover 38, ends 40, 42, base 44, L-shaped assembly 46 and side 48. Ends 40, 42 can include louvers 50 and/or a fan 52 to help cool the components of power supply 22. Additionally, and when assembled together, ends 40, 42, base 44, L-shaped assembly 46 and side 48 can comprise a wind tunnel 53 on the inside thereof that additionally provides a cooling air flow for various components of power supply 22. Feet 54 connect to base 44 using fasteners 56.

Some of the components of power supply 22 also include fuse block 58 for output fuses, choke 60, heat sink 62, capacitor module 64, and circuit board 66. Capacitor module 64 can be mounted on surface 68 of assembly 46, and capacitors 70 can connect to circuit board 66 at connectors 72. Some of these components are mounted on the inside of the wind tunnel 53, as are some other electronic/electrical components of circuit board 66, for the cooling of these components. Further, these components can be part of input circuit 101 (FIG. 5) and/or an output circuit 102 as will be discussed below. Transformer 103, which is discussed more fully below, is mounted to side 48 within the wind tunnel 53.

Figure 5:
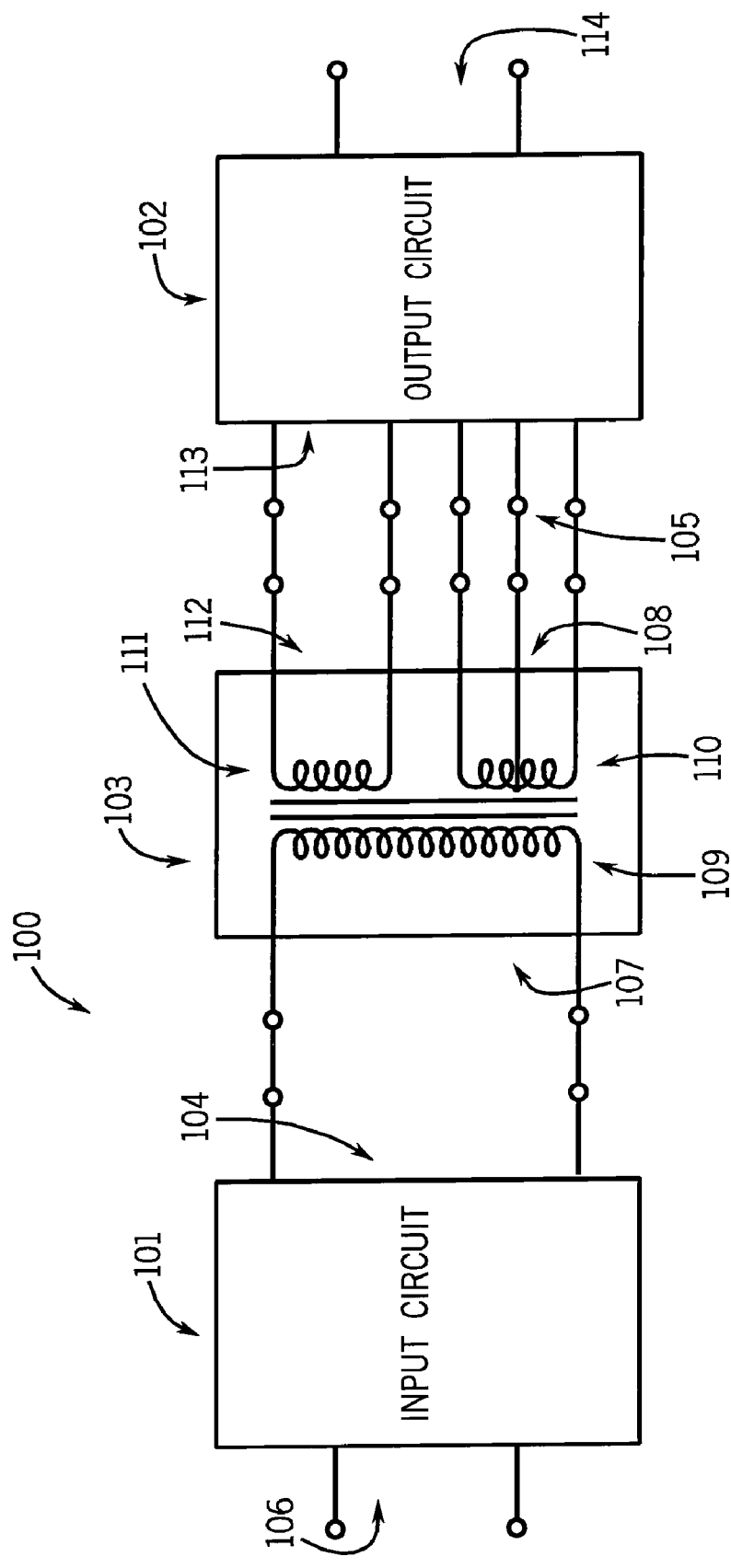
FIG. 5 is a simplified block diagram of the battery charging power supply of FIG. 2.

FIG. 5 illustrates an electrical block diagram of at least part of battery-charger, power supply 22 according to one embodiment of the present invention. Power supply 22 includes an input circuit 101, an output circuit 102 and a transformer 103. Transformer 103 is connected between an output 104 of input circuit 101 and inputs 105 and 113 of output circuit 102 in this embodiment. The overall operation of power supplies of the type shown in FIG. 2-5 are well understood by those of ordinary skill in the art.

Generally speaking, input circuit 101 is configured to receive an input signal from an external source of power at its input 106. Input signal and output signal as used herein include voltage signals, current signals, and power signals. Source of power as used herein includes any source of power that can be used by a battery charger-type power supply to obtain a battery charger-type output signal suitable for battery charging.

The input signal received at input 106 is processed by the various circuitry of input circuit 101 and the processed signal is provided to transformer 103 at output 104. The output signal from input circuit 101 is received by transformer 103 via its input 107 and transformed to its outputs 108, 112. In one embodiment, transformer 103 includes a primary coil 109 connected to the output 104 of input circuit 101 and a center tapped secondary coil 110 connected to the input 105 of output circuit 102. Secondary coil 110 is disposed inside of transformer 103 to magnetically couple with primary coil 109.

In addition to secondary coil 110, this embodiment also includes a boost coil 111 disposed to magnetically couple with primary coil 109. The output 112 of boost coil 111 is provided to output circuit 102 at input 113.

In another embodiment, secondary coil 110 of transformer 103 is not a tapped coil while in other embodiments, secondary coil 103 is tapped at different locations such as quarter tapped or two-thirds tapped. In yet other embodiments, multiple secondary coils are provided such as two, three or four secondary coils, some or all of which may be connected to output circuit 102. In yet another embodiment, coil 109 is the secondary coil and coil 110 is the primary coil.

The output signal from secondary coil 110 is received by output circuit 102 at input 105. The input signal is processed by the various circuitry of output circuit 102 and the processed signal is provided at output 114 as a signal suitable for battery charger. As used herein, the term battery charger-type output means an output signal that is suitable for battery charging.

Input circuit as used herein includes any circuit capable of receiving an input signal from a source of power and providing an output signal usable by a transformer. Input circuits can include as part of their circuitry, microprocessors, analog and digital controllers, switches, other transformers, rectifiers, inverters, converters, choppers, comparators, phased controlled devices, buses, pre-regulators, diodes, inductors, capacitors, resistors, etc.

Output circuit as used herein includes any circuit capable of receiving an input signal from a transformer and providing an output signal suitable for a desired purpose, such as battery charger-type output signal (e.g., suitable for battery charging. Output circuits can include microprocessors, analog and digital controllers, switches, other transformers, rectifiers, inverters, converters, choppers, comparators, phased controlled devices, buses, pre-regulators, diodes, inductors, capacitors, resistors, etc.

Figure 6:
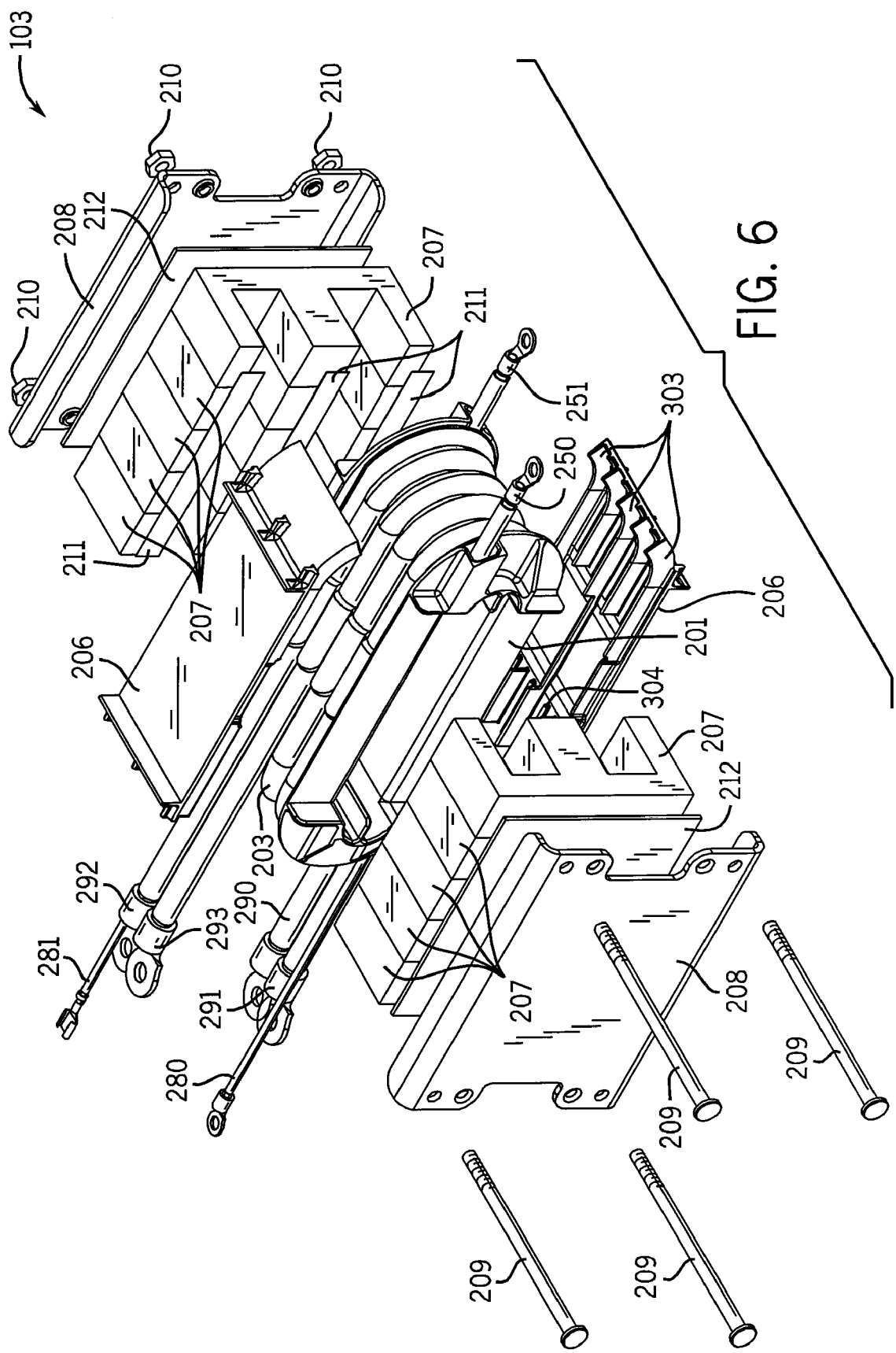
FIG. 6 is an exploded perspective view of the electrical transformer of the battery charging power supply of FIG. 2, and according to one embodiment of the present invention.

An electrical transformer configuration for transformer 103 according to one embodiment of the present invention is shown in FIG. 6. Transformer 103 includes a transformer bobbin 201 (also called a coil former), a first coil 202 (see FIG. 8), a second coil 203 (see FIG. 11), a third coil 204 (see FIG. 10), an insulating shroud 205 (see FIG. 11), a two piece cover 206, a plurality of laminated magnetic cores 207 and a pair of mounting brackets 208.

Bobbin 201 is located at the center of transformer 103. First coil 202 is wound around bobbin 201 and is the primary coil in this embodiment. Insulating shroud 205 is located over primary coil 202. Second and third coils 203, 204 are wound around insulating shroud 205 with second coil 203 wound over the top of third coil 204 in this embodiment. Second coil 203 is the secondary coil in this embodiment while third coil 204 is the boost coil. In other embodiments, first coil 202 is the secondary coil and second coil 203 is the primary coil. Two piece cover 206 is then positioned over second coil 203.

Magnetic E-cores 207 are installed into and around coils 202, 203 and 204 such that there are five cores on each side of bobbin 201. The legs from the cores on one side of bobbin 201 abut up against the legs of the cores on the other side of bobbin 201 to form two core winding windows for coils 202, 203, and 204. A plurality of paper insulating strips 211 are placed between the ends of each abutting E-shaped core leg to adjust the overall magnetization of the transformer core.

Mounting brackets 208 are mounted on either side of bobbin 201 and are secured in place using bolts 209 and nuts 210. A rubber gasket 212 is placed between each bracket 208 and cores 207 to prevent damage to cores 207 during final assembly. When completely assembled, all of the creepage distances between the various coils in transformer 103 and between the magnetic cores of transformer 103 and the various coils of transformer 103 in this embodiment conform to applicable creepage distance standards for battery charging-type power supplies.

Bobbin 201, insulating shroud 205 and cover 206 are molded pieces in this embodiment made from a glass filled polyester such as Rynite® FR-530 manufactured by DuPont Corporation. The present invention is not limited to this material however and in other embodiments other materials are used. Likewise, in other embodiments, one or more of the above mentioned parts are not molded parts.

Figure 7:
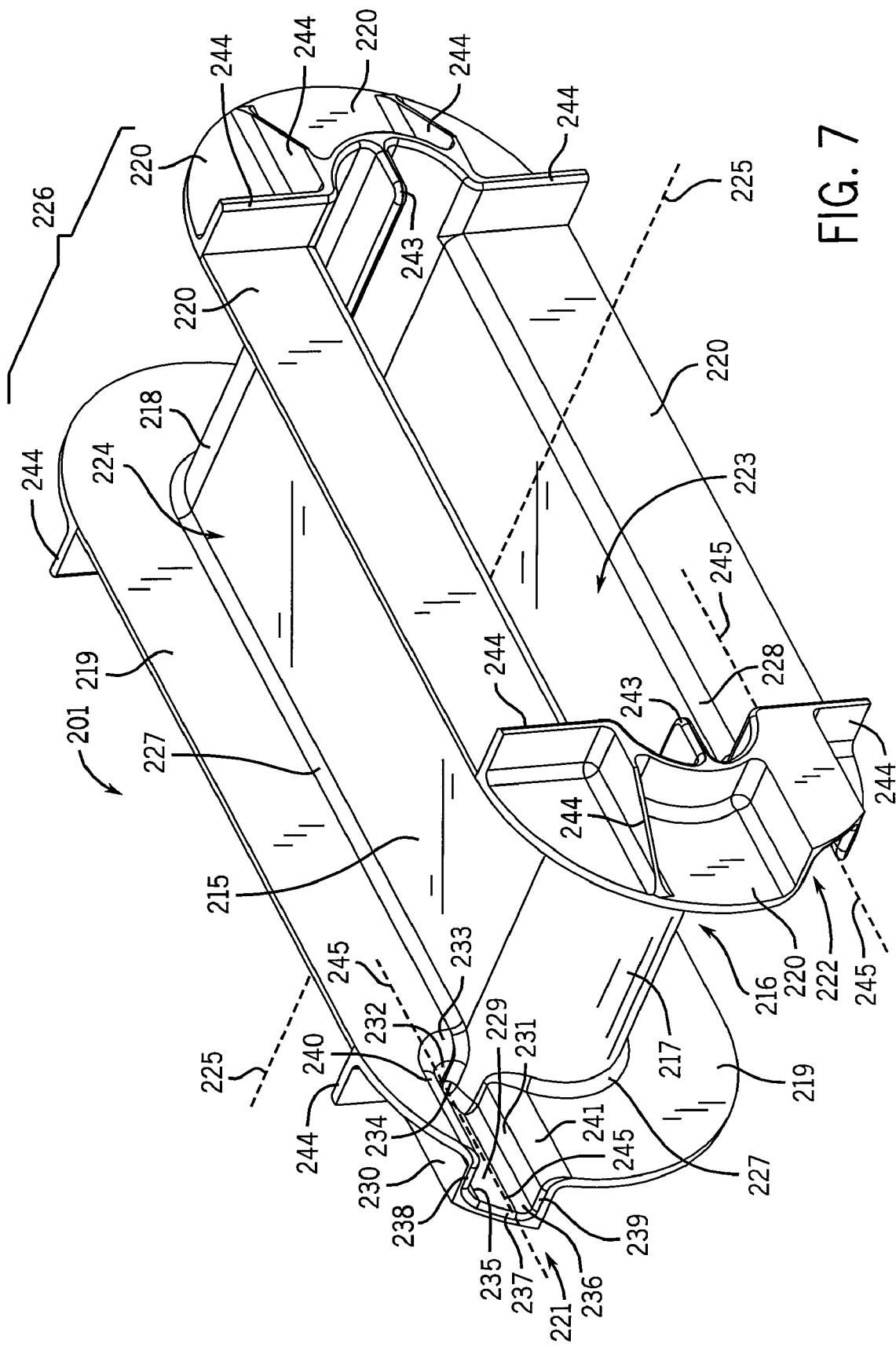
FIG. 7 is a perspective view of a bobbin used in the electrical transformer shown in FIG. 6.

Bobbin 201 as shown in FIG. 7 includes top and bottom coil supporting surfaces 215, 216 (coil supporting surface 216 is on underside of bobbin 201), first and second semi-circular end coil supporting surfaces 217, 218, first and second sidewalls 219, 220, first and second elongated channel wire exits 221, 222 and a central opening 223 in this embodiment. Top and bottom coil supporting surfaces 215, 216 are connected at their ends to curved coil supporting surfaces 217, 218 to form a continues coil winding surface 224. Coil winding surface 224 is symmetrically disposed about a central axis 225.

Coil supporting surfaces 215, 216 are elongated and disposed parallel to each other with curved end coil supporting surfaces 217, 218 being semi-circular in this embodiment. In alternative embodiments, coil supporting surfaces 215, 216 are disposed substantially parallel to each other. Likewise, in alternative embodiments, curved end coil supporting surfaces 217, 218 are substantially semi-circular.

Although coil supporting surfaces 215, 216 are referred to as top and bottom surfaces herein, the terms top and bottom are used to refer to the drawings only and the actual orientation of these surfaces can vary when transformer 103 is installed. For example, top and bottom coil surfaces can be oriented vertically, horizontally or at any angle in various embodiments of the present invention.

Upwardly directed bobbin side walls 219, 220 are located on opposite sides of continuous coil winding surface 224. Sidewalls 219, 220 combined with coil winding surface 224 define a coil winding window 226 around bobbin 201. Coil winding window 226 is also symmetrically disposed about central axis 225 in this embodiment.

Each sidewall 219, 220 is integrally connected to winding surface 224 and intersects coil winding surface 224 along an inside edge 227 and an outside edge 228. In this embodiment, both inside edges 227 and outside edges 228 are radiused to provide a smooth transition between each sidewall 219, 220 and coil winding surface 224. In other embodiments, one or both of bobbin sidewalls 219, 220 are not integral with coil winding surface 224, but rather are separate pieces that slide over coil winding surface 224 from each side.

Molded into each sidewall 215, 216 at one end of bobbin 201 are wire exits 221, 222. In this embodiment, wire exits 221, 222 are essentially three sided elongated channels open on the fourth side to winding window 226 (e.g., in open communication with winding window 226). Each wire exit is disposed about a wire exit axis 245. Each of the wire exit axes 245 are perpendicular to central axis 225 in this embodiment. In other embodiments, one or more of the wire exit axes are substantially perpendicular to central axis 225.

Wire exits 221, 222 are also disposed adjacent to winding window 226 in this embodiment. The phrase adjacent to the winding window as used herein means that the entire winding window in the vicinity of the wire exit is available for use by other coils. In an alternative embodiment, one or more of wire exits 221, 222 are not adjacent to winding window 226, but rather are disposed fully or partially inside of winding window 226.

Wire exits 221, 222 are similar in construction and only wire exit 221 will be described in detail herein. The discussion of wire exit 221 is equally applicable to wire exit 222 in this embodiment. Wire exit 221 includes an outside wall 229, a top wall 230, a bottom wall 231 and a rear wall 232. The intersection of rear wall 232 with bobbin sidewall 215 defines a first inside edge 233 while the intersection of rear wall 232 with outside wall 229 defines a second inside edge 234. Similarly, outside wall 229 intersects top and bottom walls 230, 231 at inside edges 235, 236 respectively and top and bottom walls 230, 231 intersect bobbin sidewall 215 at inside edges 240, 241 respectively Each of the inside edges 233, 234, 235, 236, 240, 241 are radiused and smooth in this embodiment.

In addition to the radiused edges between the various walls of wire exit 221, the open ends of each wall are also beveled and smooth. For example, the open end 237 of outside wall 229 includes a bevel at its end. Similarly, the open ends 238, 239 of top and bottom walls 230, 231 are similarly beveled.

Although radiused edges and ends are desirable to help prevent damage to the coil windings, they are not required. In other embodiments, for example, some or none of the inside edges and open ends of wire exits 221, 222 are radiused and smooth. Likewise, although elongated wire exits 221, 222 have a generally square cross-section in this embodiment, the present invention is not limited to wire exits having square cross-sections. In other embodiments of the present invention, other cross sections are used including rectangular, curved and semi-circular.

The present invention is also not limited to two wire exits. In an alternative embodiment, for example, a single wire exit is provided. In other embodiments, more than two wire exits are provided including three, four, five and six wire exits (e.g., two for the primary coil wire lead ends, two for the secondary wire lead ends and two for the boost coil lead ends).

The location of wire exits can also vary depending on the particular application for which the transformer is to be used. Generally speaking, one or more wire exits can be located at any point around the perimeter of bobbin 201. For example, in other embodiments, one or more wire exits are located on one end of bobbin 201 while one or more wire exits are also located on the other end of bobbin 201. For instance, the primary coil wire lead ends exit bobbin 201 from opposite ends in one embodiment. In other embodiments, one or more wire exits are located on the top and bottom of bobbin 201.

Bobbin 201 also includes several reinforcement ribs 244 and 243. These are added to strengthen bobbin 201 and to add rigidity. With respect to ribs 243, these ribs are also used as locating ribs (or flanges or spacers) to locate magnetic cores 207 (see FIG. 6) inside of central opening 223 when transformer 103 is completely assembled.

Figure 8:
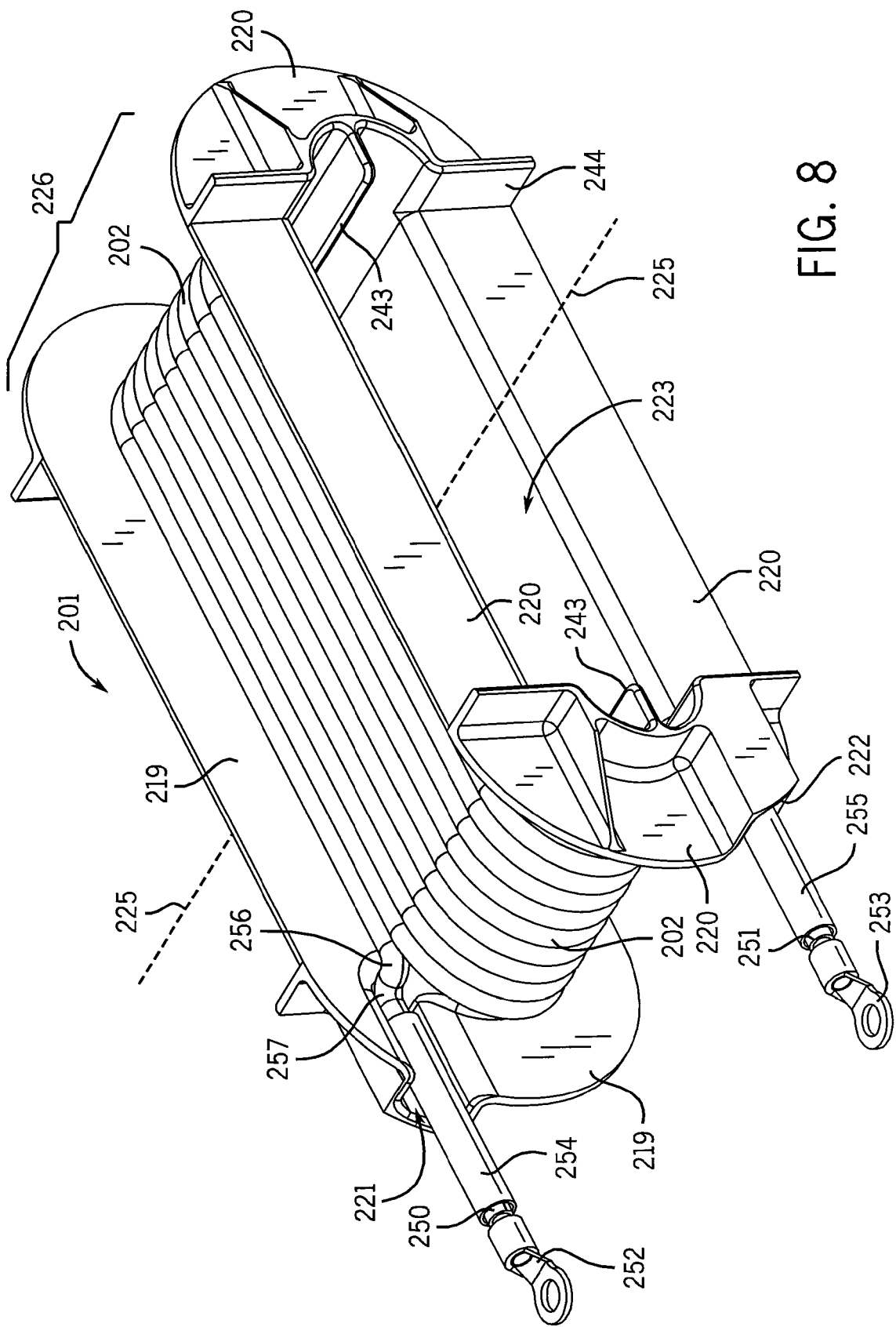
FIG. 8 is an perspective view of a first coil wound around the bobbin shown in FIG. 7.

FIG. 8 shows first coil 202 wound around coil winding surface 224 inside of winding window 226. Primary coil 202 includes a single layer of thirteen (13) individual turns that completely fill the width of winding window 226 in this embodiment. Primary coil 202 is made from 10½ gauge stranded and woven Litz wire and has a diameter of 4.14 mm (0.163 inches). In other embodiments, primary coil 202 is made from wire of a different gauge in the range of 6 to 14 gauge wire including 8, 10, 12 and 14 gauge wire. The overall width of primary coil 202 in this embodiment is 53.82 mm (2.119 inches).

Primary coil 202 includes a first lead end 250 and a second lead end 251. Each lead end is terminated with a conventional lug fastener 252, 253. An insulating Teflon® sleeve 254, 255 is also slid over each lead end 250, 251 in this embodiment to provide added protection to the lead ends against cutting or abrasion. Wire lead ends 250, 251 exit bobbin 201 via wire exits 221, 222 in a direction that is perpendicular to central axis 225.

Figure 9:
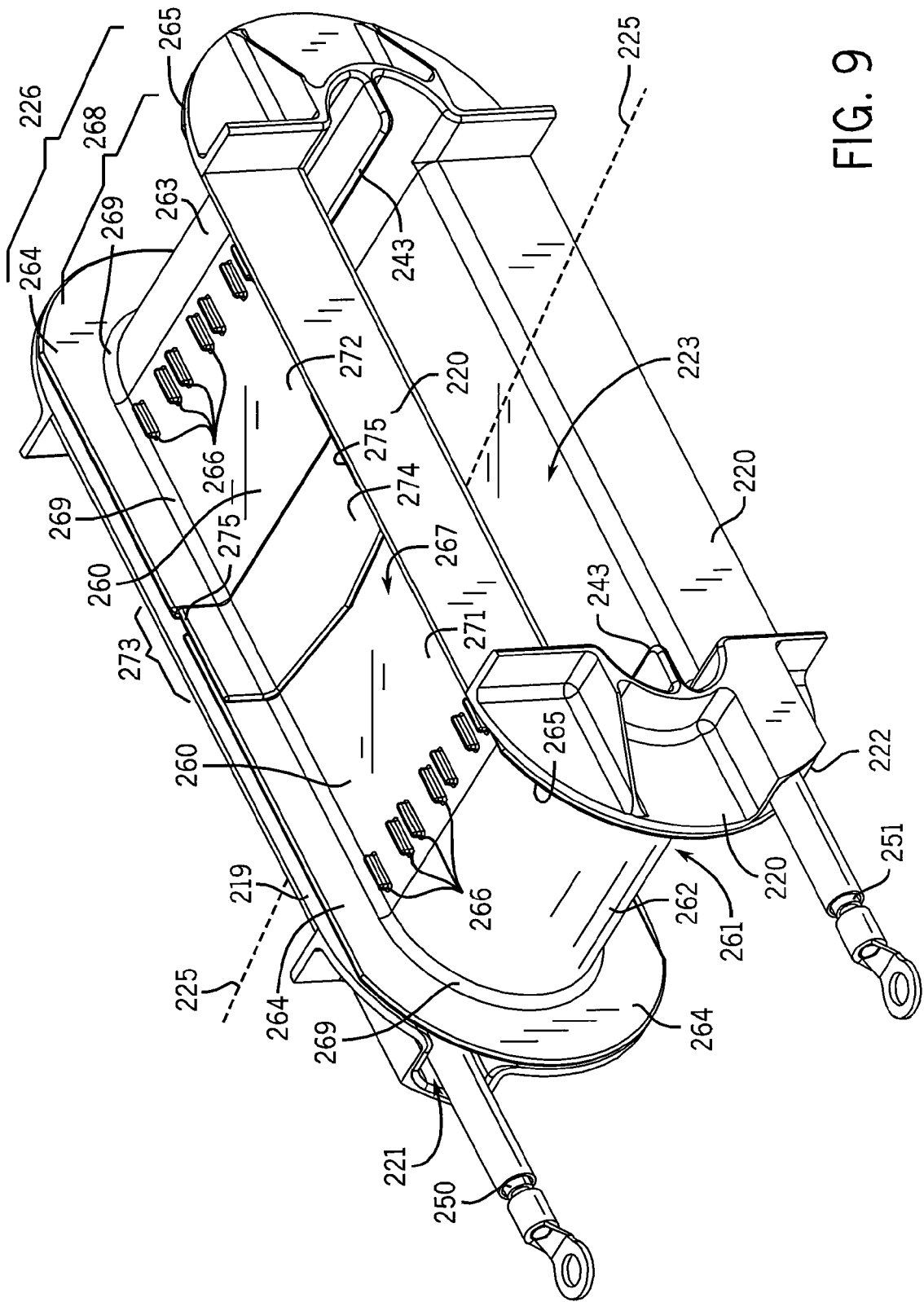
FIG. 9 is an perspective view of an insulating shroud wrapped around the first coil shown in FIG. 8.

Insulating shroud 205 as shown in FIG. 9 in detail includes top and bottom elongated coil supporting surfaces 260, 261, first and second semi-circular end coil supporting surfaces 262, 263, first and second insulating shroud sidewalls 264, 265 and a plurality of locating bosses 266. Top and bottom coil supporting surfaces 260, 261 are disposed parallel to each other and are connected at their ends to semi-circular end coil supporting surfaces 262, 263 to form a second continuos coil winding surface 267 symmetrically disposed about central axis 225 of bobbin 201. In an alternative embodiment, coil supporting surfaces 260, 261 are disposed substantially parallel to each other and curved end coil supporting surfaces 262, 263 are substantially semi-circular.

Coil winding surface 267 in this embodiment substantially conforms to the shape of primary coil 202. In other words, the shape of coil winding surface 267 is substantially the same as the shape of primary coil 202 when primary coil 202 is wound on coil winding surface 224. Making the shape of coil winding surface 267 substantially conform to the shape of primary coil 202 reduces or minimizes the mean distance between the individual turns of secondary coil 203 (which is wound around coil winding surface 267) and the individual turns of primary coil 202.

Upwardly directed insulating shroud sidewalls 264, 265 are located on opposite sides of continuous coil winding surface 267. Insulating shroud sidewalls 264, 265 combined with coil winding surface 267 define a second coil winding window 268 around insulating shroud 205. Each insulating shroud sidewall 264, 265 is integral with coil winding surface 267 and intersects coil winding surface 267 along an inside edge 269 and an outside edge (not shown). In this embodiment, both inside edges 269 and the outside edges are radiused to provide a smooth transition between each insulating shroud sidewall 264, 265 and coil winding surface 267. In other embodiments, one or both of insulating shroud sidewalls 264, 265 are not integral with coil winding surface 267, but rather are separate pieces that slide over coil winding surface 267 on either side.

Insulating shroud 205 in this embodiment is comprised of two separate segments 271, 272 that mate together at an overlapping joint 273. Two separate pieces are used to allow insulating shroud 205 to be easily installed over primary coil 202 after primary coil 202 has been wound around coil winding surface 224. In other embodiments, insulating shroud 205 is a one piece shroud or is comprised of more than two separate pieces or segments.

Segments 271, 272 of insulating shroud 205 are identical in this embodiment. Segment 272 is merely reversed to allow it to interengage with segment 271. The two segments are brought together over first winding 202 by simply sliding each segment in from the opposite ends of bobbin 201 until segment 271 overlaps with segment 272 in the middle of winding window 226 at joint 273. To facilitate overlapping of the two segments, one end of each segment 271, 272 includes a slightly raised coil supporting surface portion 274 and a pair of insulating shroud sidewall portions 275 that jog slightly inward. The raised coil supporting surface of one segment then slides on top of flat coil supporting surface of the other segment at overlap joint 273. Likewise, the inwardly jogged sidewall portions on one segment simply slide inside of the insulating shroud sidewalls on the other segment at joint 273. A similar overlapping joint is created on the bottom side of bobbin 201 when the two segments are brought together.

Figure 10:
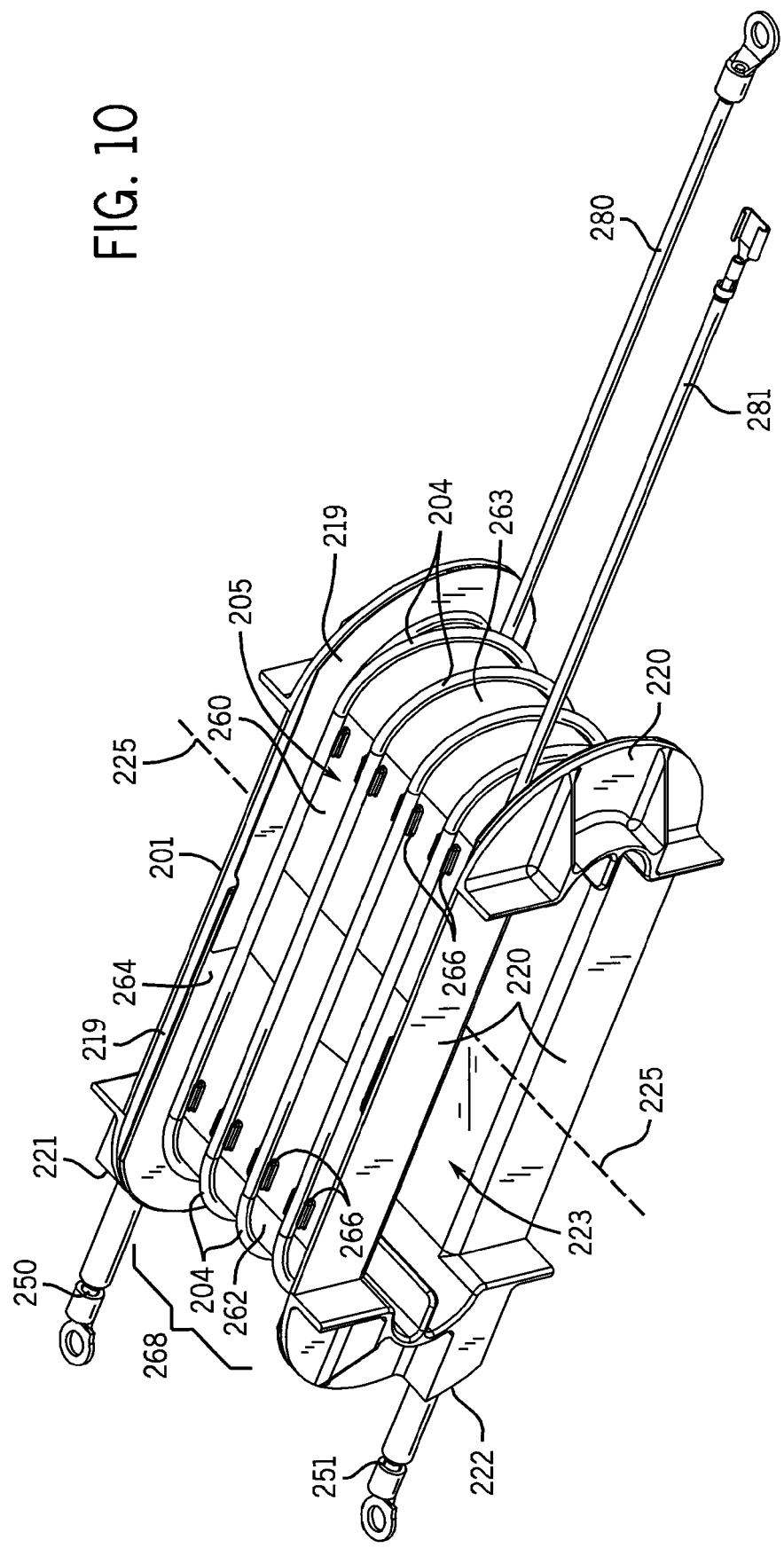
FIG. 10 is an perspective view of a third coil wound around the insulating shroud shown in FIG. 9.

FIG. 10 shows third coil 204 wound around coil winding surface 267 inside of winding window 268 of insulating shroud 205. Third coil 204 in this embodiment is a boost coil. Boost coil 204 includes a single layer of five (5) turns equally spaced across winding window 268 of insulating shroud 205. Locating bosses 266 on coil winding surface 267 are provided to maintain the desired equal spacing between each individual turn of boost coil 204. Boost coil 204 is made from 15 gauge stranded and woven Litz wire and has an outside diameter of 2.69 mm (0.106 inches) in this embodiment. In other embodiments, boost coil 204 is made from wire of a different gauge including 12 gauge wire.

The lead ends 280, 281 of boost coil 204 in this embodiment exit bobbin 201 on the opposite end from where lead ends 250, 251 of primary coil 202 exit bobbin 201. In an alternative embodiment, one or more of the boost coil lead ends exit bobbin 201 on the same end as lead ends 250, 251. In other embodiments, one or more of the boost coil lead ends exit bobbin 201 through wire exits that guide the boost coil lead ends out of bobbin 201 in a direction perpendicular or substantially perpendicular to central axis 225.

Figure 11:
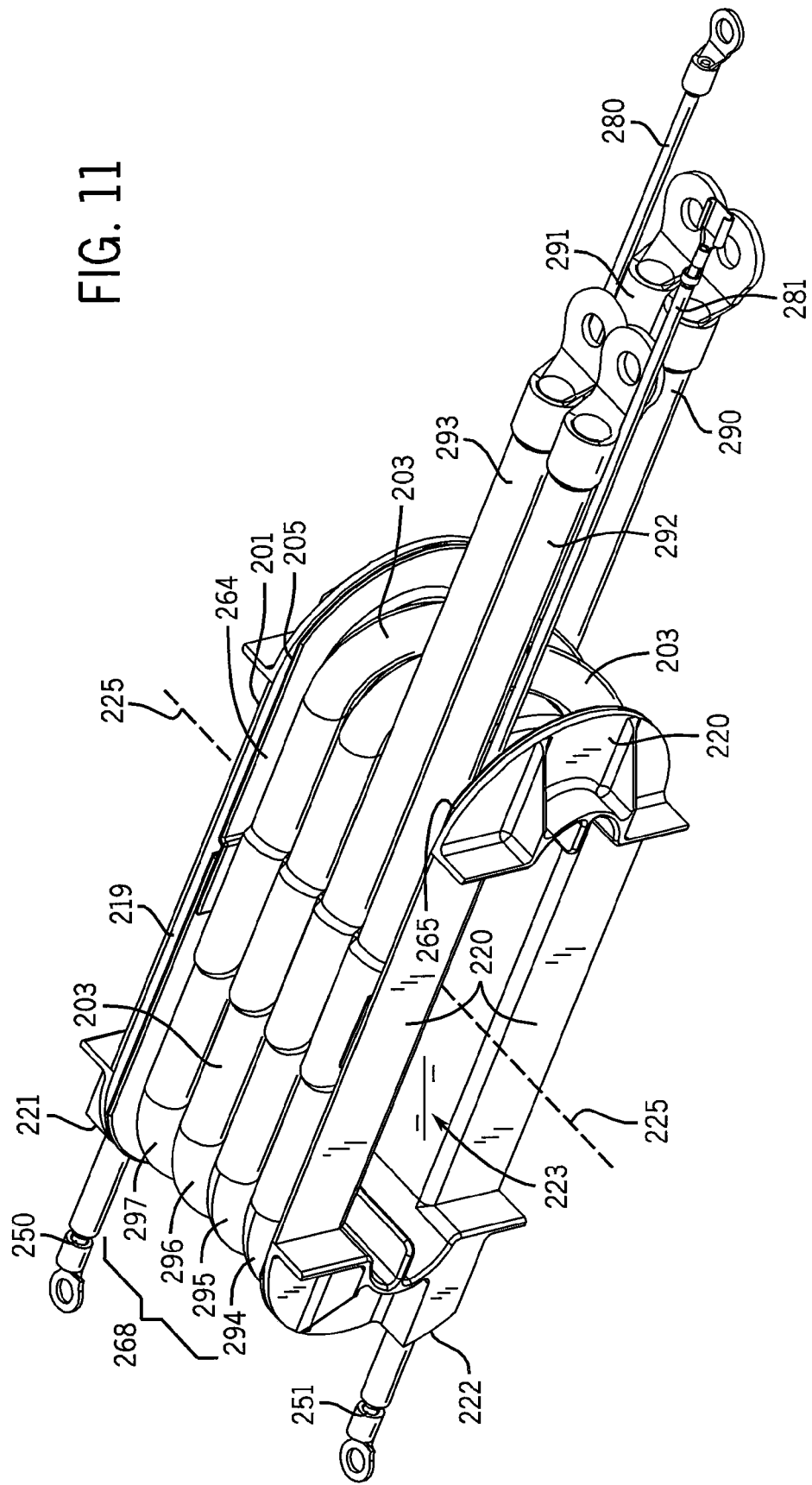
FIG. 11 is an perspective view of a second coil wound around the insulating shroud shown in FIG. 9.
Figure 12:
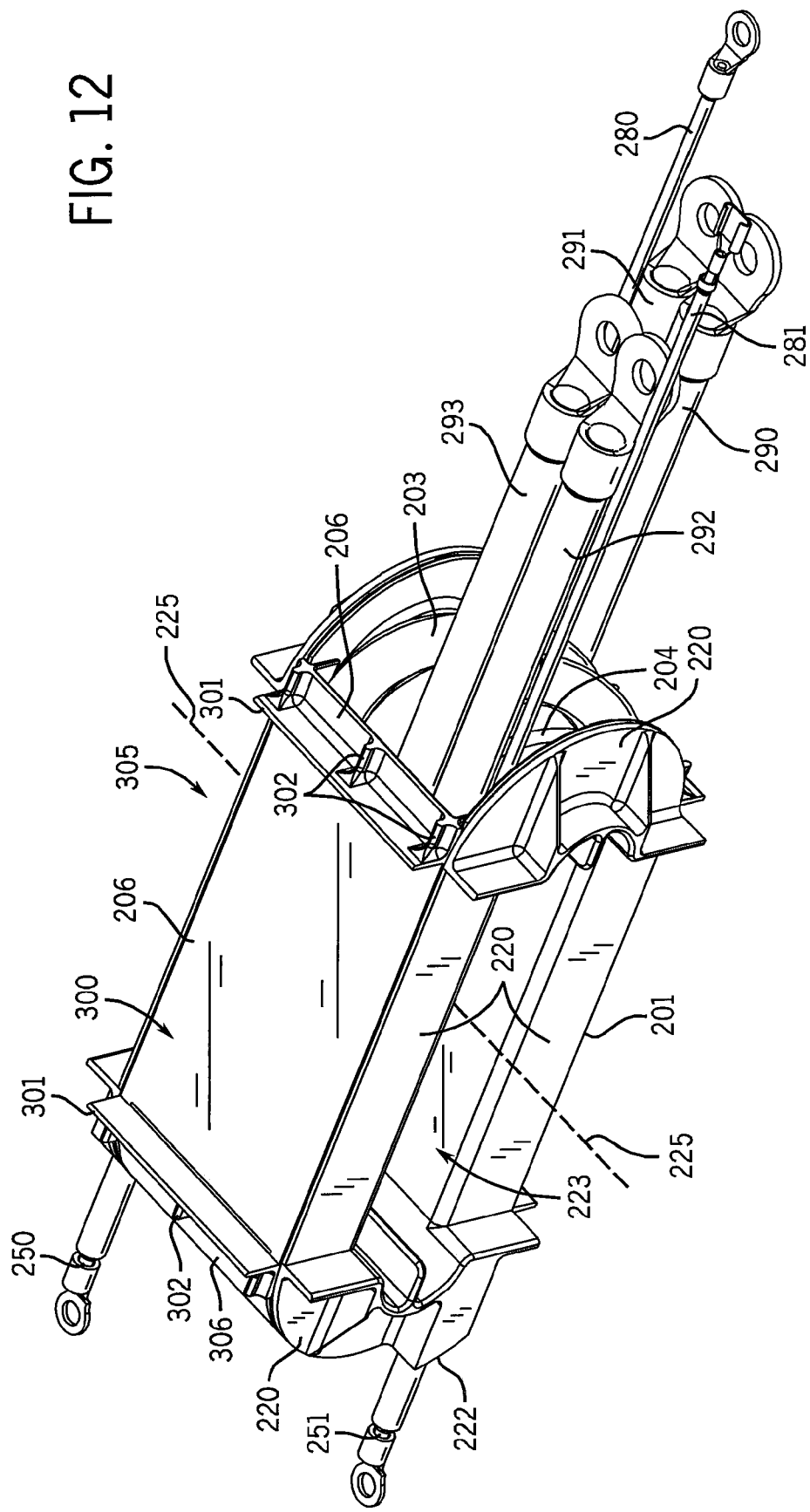
FIG. 12 is an perspective view of a cover disposed about the second coil shown in FIG. 11.
Figure 13:
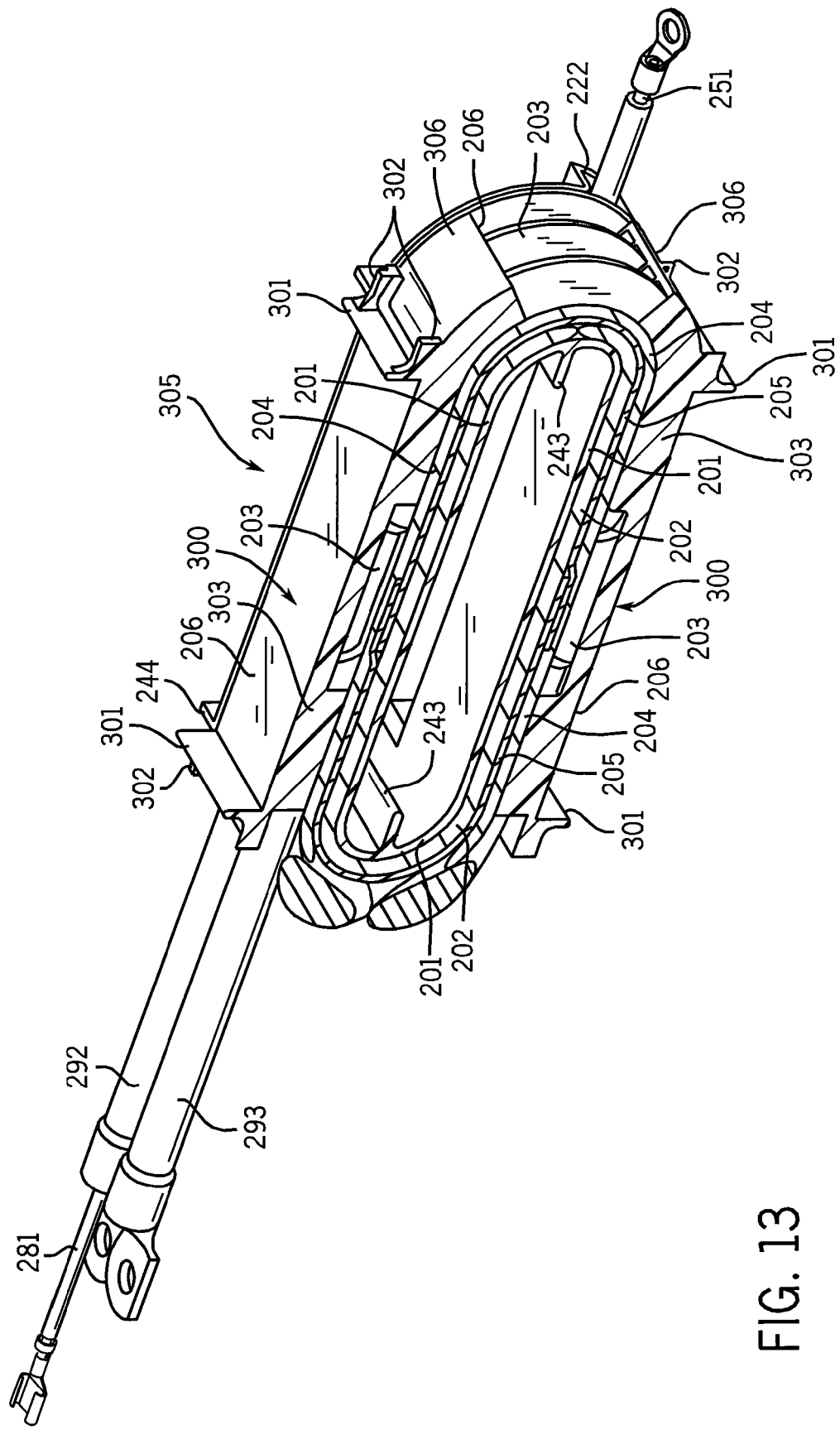
FIG. 13 is an perspective length wise cross-sectional view of the electrical transformer shown in FIG. 6.
Figure 14:
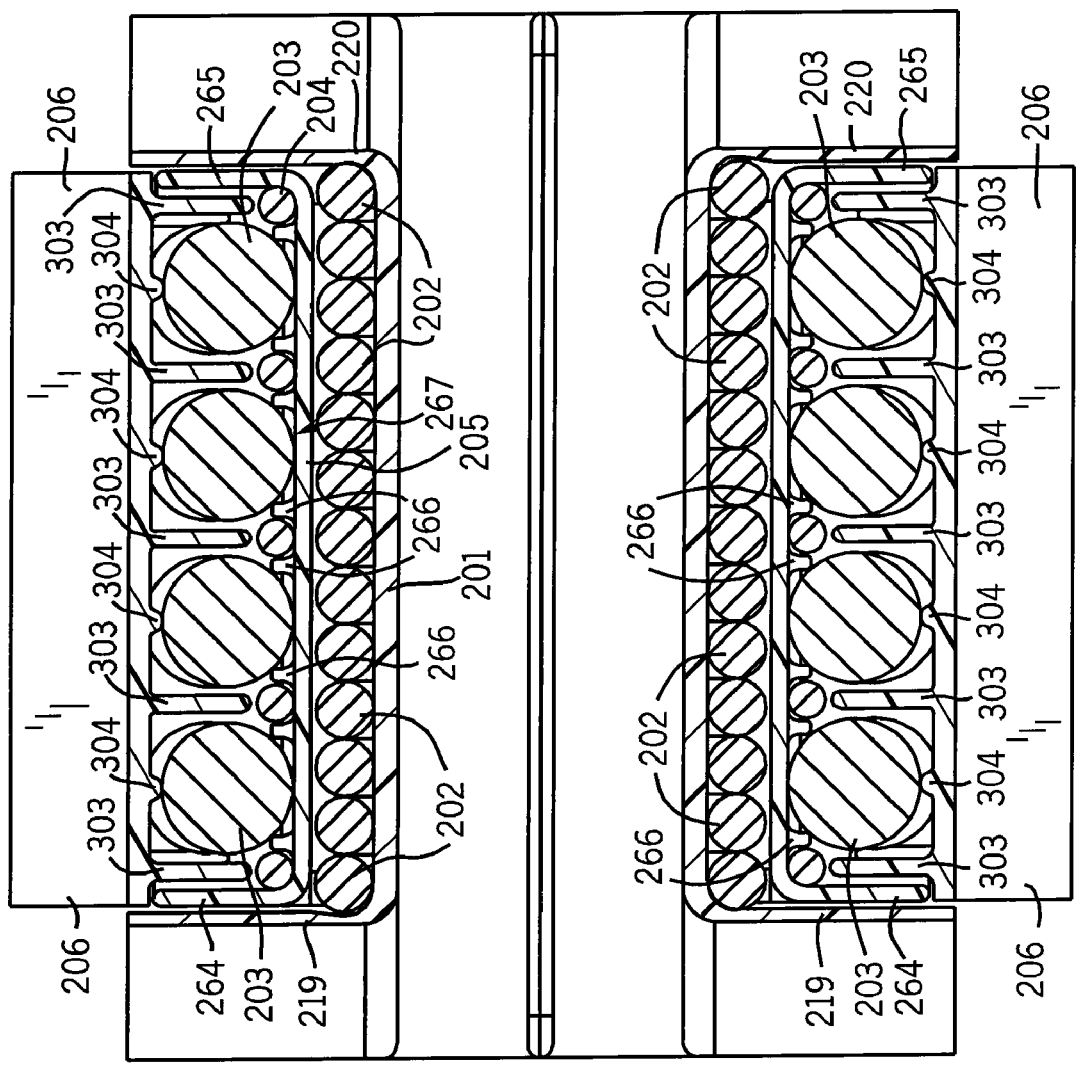
FIG. 14 is a width wise cross-sectional view of the electrical transformer shown in FIG. 6.

Second coil 203 is shown in FIG. 11 wound around coil winding surface 267 inside of winding window 268 of insulating shroud 205. This coil is the secondary coil in this embodiment and is wound over the top of boost coil 204. Secondary coil 203 is a single layer coil comprised of a total of four (4) individual turns each of which is located between locating bosses 266 (see FIG. 14). The coil includes a first lead end 292 and a second lead end 291 each of which is terminated with a conventional lug fastener.

Secondary coil 203 also includes a center tap in this embodiment which divides the coil into two segments. Secondary coil 203 is center tapped by connecting secondary wire lead ends 290, 293 together on the outside of transformer 103. Each segment of secondary coil 203 includes two of the four turns (e.g., two turns are located on each side of the center tap). Electric current flows through only one segment of secondary coil 203 at a time when transformer 103 is used in power supply 22. In other embodiments, however, current is flowing in both segments at the same time.

The individual turns of center tapped secondary coil 203 in this embodiment are wound in a bifilar manner (e.g., interleaved with each other). For example, turn 294 and turn 296 (the first and third turns) comprise the two turns in one segment of secondary coil 203 (e.g., on one side of the center tap) while turns 295 and 297 (the second and fourth turns) comprise the two turns of the other segment of secondary coil 203 (on the other side of the center tap). To illustrate this another way, starting with wire first lead end 292, secondary coil 203 is wound around bobbin 201 once (turn 294), twice (turn 296) and then exits bobbin 201 at end 290. End 290 is connected to end 293 to form the center tap. Coil 203 then continues from end 293 around bobbin 201 once (turn 295) and twice (turn 297) and finally exits bobbin 201 at lead end 291.

In an alternative embodiment, secondary coil 203 is not wound in a bifilar manner in which case turns 294 and 295 are on one side of the center tap and turns 296 and 297 are on the other side of the center tap.

Winding secondary coil 203 in a bifilar manner reduces or minimizes the leakage inductance between primary coil 202 and each of the segments of secondary coil 203 to a desired value. This is because the mean distance between each turn of primary coil 202 and each turn of each segment of secondary coil 203 is reduced or minimized as compared to the case where center tapped secondary coil 203 is not wound in a bifilar manner. In other embodiments of the present invention, secondary coil 203 is not tapped or is tapped at other locations such as quarter tapped or two-thirds tapped.

Secondary coil 203 is made from 4 gauge stranded and woven Litz wire (1625 strands of 36 gauge wire) and has an outside diameter of 8.28 mm (0.326 inches). In other embodiments, secondary coil 203 is made from wire of a different gauge in the range of 3 to 10 gauge wire including 6, 8 and 10 gauge wire. The overall width of secondary coil 203 in this embodiment is approximately 44.1 mm (1.736 inches). Secondary coil 203 in this embodiment does not completely fill winding window 268. Rather, secondary coil 203 is centered width wise inside of winding window 268 (and also width wise inside of winding window 226 of bobbin 201) and each of the individual turns of secondary coil 203 are spaced apart from each other equally (see FIG. 10). In other words, the pitch between coil turns of secondary coil 203 is greater than the diameter of the wire used for secondary coil 203. In this embodiment, the spacing between individual turns is approximately 0.144 inches from the outside surface of each turn (0.470 inches center to center).

Equally spacing the individual turns of secondary coil 203 apart from one another reduces the mean distance between the individual turns of primary coil 202 and secondary coil 203 in this embodiment. By reducing or minimizing the mean distance between turns, the leakage inductance of transformer 103 is reduced or minimized to a desired value.

The lead ends 292, 291 of secondary coil 203 exit bobbin 201 on the opposite end from where lead ends 250, 251 of primary coil 202 exit bobbin 201. In an alternative embodiment, one or more of the secondary coil lead ends exit bobbin 201 on the same end as lead ends 250, 251. In other embodiments, one or more of the secondary coil lead ends exit bobbin 201 through wire exits that guide the secondary coil lead ends out of bobbin 201 in a direction perpendicular to or substantially perpendicular to central axis 225.

Two piece cover 206 as shown in FIG. 6 is designed to fit over the top of secondary coil 203. Cover 206 is a two piece cover (the other half of two piece cover 206 is on the bottom side of bobbin 201) in this embodiment but is comprised of a single piece in other embodiments and is more than two pieces in yet other embodiments. Each half of two piece cover 206 rests inside of bobbin sidewalls 219, 220 in this embodiment and includes a plurality locating spacers 303 (see FIG. 6).

Locating spacers 303 are disposed on the underside of cover 206 and project between the individual turns of secondary coil 203. In addition to the locating spacers that are located between each turn of secondary coil 203, one locating spacer is also disposed on the outside of each of the outside turns (e.g., turns 294 and 297) of secondary coil 203 in this embodiment.

Locating spacers 303 are provided for three reasons in this embodiment. First, to help maintain the desired spacing (e.g., equal spacing in this embodiment) between the individual coil turns of secondary coil 203. Maintaining the desired spacing between secondary coil turns helps to insure that the leakage inductance of the transformer is reduced or minimized to a desired value. Second, locating spacers 303 help insure part-to-part consistency during manufacturing. Locating spacers can be especially useful in this regard when the individual turns of a coil do not completely fill the winding window, such as in the case of secondary coil 203. Third, locating spacers 303 are disposed directly above the individual turns of boost coil 204 in this embodiment and help maintain those turns in their desired locations between locating bosses 266.

The term locating spacer or locating boss, as used herein, means any structure that is provided to maintain a desired spacing between two individual turns of a coil. Spacers or insulating layers placed between the various layers of a coil (e.g., layers contain multiple coil turns) are not locating spacers as that term is used herein. It should also be understood that the term locating spacer or boss as used herein includes both structures that are integral with the cover, the winding surface or some other part of the bobbin as well as structures that are separate pieces. Locating spacers can include such structures as fasteners, screws, bolts, washers, nuts, etc.

Although the present invention is shown with locating spacers projecting inward from cover 206 between the turns of secondary coil 203, the present invention is not limited to this configuration and other configurations can be used as well. For example, a plurality of locating spacers project outward from coil winding surface 267 between the individual turns of secondary coil 203 in an alternative embodiment. In another embodiment, some of the plurality of locating spacers project inward from cover 206 and some of the plurality of locating spacers project outward from coil winding surface 267. In yet another embodiment, the locating spacers are free floating and are merely inserted between each of the turns of secondary coil 203.

The use of locating spacers is also not limited to use with secondary coils and in other embodiments locating spacers are used with primary and boost coils as well to maintain a desired spacing between coil turns. In fact, locating bosses 266 are one example of the use of locating spacers to maintain the spacing of the individual turns of a boost coil. In other embodiments, locating spacers project inward from the underside of insulating shroud 205, project outward from the coil winding surface 224 of bobbin 201, or project both from the underside of insulating shroud 205 and outward from coil winding surface 224, to maintain a desired spacing between each of the turns of the coil wound around coil winding surface 224 (e.g., primary coil 202 in this embodiment).

Each cover piece 206 also includes a flat elongated core supporting surface 300, a pair of core alignment bosses 301 disposed on opposite ends of core supporting surface 300 to define a core window 305, a plurality of bracket alignment bosses 302, a plurality of compression bosses 304 (also shown in FIG. 14) and a curved cover end portion 306. Core window 305 is provided to accommodate the top and bottom legs of magnetic E-cores 207. These legs fit snugly inside of core window 305 between core alignment bosses 301. Bracket alignment bosses 302 are provided to support and align bolts 209 which are used to secure brackets 208 on either side of transformer 103. The curved end portion 306 on each cover piece is desirable to help prevent secondary coil 203 from being pushed out the end of bobbin 201.

The dimensions of transformer 103 in this embodiment are such that the plurality of magnetic E-cores 207 fit snugly into central opening 223 and snugly over two piece cover 206. This snug fit compresses cover 206 (including curved sections 306) and bobbin 201 together which in turn compresses secondary coil 203 and primary coil 202 together. This compression further reduces or minimizes the mean distance between the individual turns of secondary coil 203 and the individual turns of primary coil 202 to a desired value thus reducing or minimizing the leakage inductance of transformer 103 to a desired value.

Compression bosses 304 are disposed on the underside of cover 206 (including on the underside of curved sections 306) and project inward to contact the individual turns of secondary coil 203 to further compress secondary coil 203 into primary coil 202. In an alternative embodiment, compression bosses are provided on coil winding surface 224 of bobbin 201 and contact each turn of primary coil 202 instead. In another alternative embodiment, compression bosses are provided on both the underside of cover 206 and on winding surface 224 of bobbin 201 to contact some or all of the turns of secondary coil 203 and primary coil 202. In one other embodiment, no compression bosses are provided.

It should be understood that compression boss as used herein includes both structures that are integral with the cover, the winding surface or some other part of the bobbin as well as structures that are separate pieces. Compression bosses can include such structures as spacers, screws, bolts, washers, springs, etc.

It should also be understood that the present invention does not require that the magnetic cores fit snugly over cover 206 to provide the compression force. In other embodiments, other structures provide the compression force. For example, in one embodiment, the cover is compressed into secondary coil 203 using fasteners such as bolts or screws. In another embodiment, bolts 209 contacting bracket alignment bosses 302 compress cover 206 into secondary coil 203. In yet another embodiment, springs are used to compress cover 206 into secondary coil 203.

Assembly of transformer 103 will now be briefly described. Primary coil 202 is first wound around coil winding surface 224 inside of the winding window 226 of bobbin 201. The turns of primary coil 202 completely fill the width of winding window 226 in this embodiment. Semi-circular end coil supporting surfaces 217, 218 help prevent bulging in primary coil 202 as it is wound around coil winding surface 224. As a result, primary coil 202 fits snugly inside of winding window 226 along the entire path of winding window 226. This is because there are no abrupt changes in coil winding surface 224 as primary coil 202 is wound around bobbin 201.

Each lead end in this embodiment exits bobbin 201 via one of the wire exits 221, 222. For example, as shown in FIG. 8, lead end 250, when exiting winding window 226, includes a first ninety (90) degree bend 256 into channel wire exit 221 and then a second ninety (90) degree bend 257 to exit channel wire exit 221. In other embodiments, bends 256 and 257 are substantially 90 degree bends or are something less than 90 degrees such as approximately 60 degrees, 45 degrees, 30 degrees, etc.

The placement of wire exits 221, 222 adjacent to winding window 226 allows the full width of winding window 226 to be used by second coil 203 in the vicinity of wire exits 221, 222 without interference from the primary lead ends 250, 251 as they exit bobbin 201. Elongated channels 221, 222 guide primary coil lead ends 250, 251 out of bobbin 201 in a known and repeatable direction that is perpendicular to central axis 225 in this embodiment. In an alternative embodiment, one or both of wire lead ends 250, 251 are guided out of bobbin 201 by wire exits 221, 222 in a direction that is substantially perpendicular to central axis 225.

Insulating shroud 205 is next placed inside of winding window 226 over the top of primary coil 202 in this embodiment. Insulating shroud winding window 268 is approximately the same size width wise along its entire path, including in the vicinity of wire exits 221, 222, as bobbin winding window 226 in this embodiment.

Boost coil 204 is then wound around second coil winding surface 267. Each of the individual turns of boost coil 204 are interspersed between the individual turns of secondary coil 203. Locating bosses 266 are provided on the surface of coil winding surface 267 to maintain the individual boost coil turns in their desired location between the individual turns of secondary coil 203.

Secondary coil 203 is then wound around second coil winding surface 267 over the top of boost coil 204. The individual turns of secondary coil 203 are equally spaced apart across the width of winding window 268. Locating bosses 266 are provided to initially locate and maintain the individual turns of secondary coil 203 in their desired positions.

Two piece cover 206 is now placed over second coil 203 from above and from below bobbin 201 (e.g., one piece is disposed opposite top surface 215 and the other is disposed opposite bottom surface 216). With cover 206 in place, locating spacers 303 on the underside of cover 206 are disposed in between each turn of secondary coil 203 and one locating spacer is disposed on the outside of each outside turn of secondary coil 203 (see FIG. 14).

Once two piece cover 206 is positioned over second coil 203 inside of winding window 226, the plurality of E shaped magnetic cores 207 are positioned. Ten individual magnetic cores are used in this embodiment, five located on each side of bobbin 201. The center leg of each E-core 207 is inserted into central opening 223 of bobbin 201 while the top leg and bottom leg of each E-core 207 reside inside of core window 305 between core alignment bosses 304. The ends of the legs of the five E-cores on one side of bobbin 201 abut up against the ends of the legs of the five E-cores on the other side of bobbin 201 to complete the magnetic path around the coils. Paper insulating strips 211 are placed between the ends of the core legs to adjust the overall magnetization of the transformer core.

Brackets 208 are placed one on each side of transformer 103 and are used to hold the transformer assembly together. A rubber gasket 212 is placed between each bracket 208 and the cores 207 to prevent damage to the cores during assembly. Four bolts 209, one on each corner of the transformer assembly, are used to hold brackets 208 in place. Bolts 209 are inserted through holes in brackets 208. Core alignment bosses 301 provide horizontal alignment of bolts 209 while bracket alignment bosses 302 provide vertical alignment of bolts 209. Bolts 209 are secured in place using nuts 210. Transformer 103 is now completely assembled and ready for installation.

The electrical transformer includes a bobbin having an elongated coil winding surface disposed about (e.g., symmetrical about) a central axis in one embodiment. The elongated coil winding surface includes a pair of straight, flat (substantially straight and substantially flat in other embodiments) surfaces disposed between a pair of substantially semi-circular end surfaces in this embodiment (the end surfaces are semi-circular in another embodiment). Semi-circular as used herein means half of a circle (e.g., 180 degree arc). A pair of upwardly directed bobbin sidewalls disposed on opposite sides of the coil winding surface define a bobbin winding window.

A primary coil is wound around the coil winding surface of the bobbin inside of the bobbin's winding window. The curved slowly changing substantially semicircular end surfaces prevent bulging in the large diameter individual turns of the primary coil as the turns are wound around the bobbin. The bobbin also includes a central opening for receiving one or more magnetic cores.

The magnetic cores in this embodiment are standard sized, off-the-shelf E shaped ferrite cores. In other embodiments, other core shapes are used including rectangular, square, I-shaped, T-shaped, round, etc. . . . The E-shaped cores used in this embodiment have rectangular or square cross-sectional legs. For example, the middle legs of the magnetic cores disposed in the central opening of the bobbin have a rectangular cross-section in this embodiment. This includes the two cores located immediately adjacent (e.g., closest) to each of the substantially semi-circular end surfaces. Rectangular cross-section as used herein includes square cross-sections and rectangular cross-sections having beveled, rounded or angled corners.

A pair of elongated channel shaped wire exits are provided, one on each side of the winding window of the bobbin. These wire exits are in open communication with the winding window and are used to guide the primary coil leads out of the winding window in a known and repeatable manner. The primary leads are guided out of the bobbin by the wire exits in a direction that is substantially perpendicular to the central axis of the winding window in this embodiment. In other embodiments, coil lead ends are guided out of the bobbin by wire exits in a direction that is perpendicular to the central axis.

It should be understood that the present invention is not limited to elongated channel wire exits and other wire exit configurations can be used. Wire exit as used herein includes any structure that can be used to guide large diameter wire lead ends out of a bobbin but does not include pins used for mounting a transformer to through holes in a circuit board.

An insulating shroud completely surrounds the primary coil in this embodiment. The insulating shroud also has an elongated coil winding surface with substantially semi-circular end surfaces. The shape of the coil winding surface of the insulating shroud conforms to the shape of the primary coil. A pair of upwardly directed insulating shroud sidewalls disposed on opposite sides of the coil winding surface define an insulating shroud winding window.

A boost coil and a secondary coil are wound around the coil winding surface inside of the winding window of the insulating shroud in this embodiment. The boost coil is wound first and uses smaller diameter wire than the secondary coil. The secondary coil is wound over the boost coil. Locating bosses on the surface of the coil winding surface of the insulating shroud are provided to maintain the turns of the boost coil in their desired locations between the turns of the secondary coil and to initially locate the individual turns of the secondary coil in their desired locations across the width of the insulating shroud winding window.

The individual turns of the secondary coil are spaced apart from one another in this embodiment to reduce the leakage inductance of the transformer to a desired value. A two piece cover is positioned over the secondary coil. The cover includes a plurality of locating spacers. In one embodiment, a locating spacer is disposed between each coil turn of the secondary coil to help maintain the desired spacing between the secondary coil turns. A locating spacer is disposed on either side of each turn of the secondary coil to help maintain the desired spacing between the secondary coil turns in another embodiment. The cover also provides insulation between the secondary coil and the magnetic cores.

Desired value of leakage inductance, as used herein, for a particular application utilizing a transformer according to the present invention includes values which allow the transformer to be used for its intended purpose in that particular application. Desired value of leakage inductance may be a range of values and may vary from application to application depending on the specifics of the application. Desired spacing between the individual turns of a coil, as used herein, for a particular application utilizing a transformer according to the present invention includes spacing which allows the transformer to be used for its intended purpose in that particular application. Desired spacing of coil turns may be a range of values and also may vary from application to application depending on the specifics of the application.

A plurality of E-shaped magnetic cores surround the bobbin in this embodiment. The middle leg of each E-core fits snugly into the central opening of the bobbin and the top and bottom legs of each E-core fit snugly over the two piece cover to compress the secondary coil and the primary coil together between the cover and the coil winding surface of the bobbin. Compressing the coils together reduces the mean distance between the turns of the primary coil and the secondary coil reducing or minimizing the leakage inductance of the transformer to a desired value. To further compress the coils together, the inside surface of the two piece cover includes a plurality of compression bosses. One compression boss is disposed on the outside of each secondary coil turn in this embodiment.

Compressing the primary coil and the secondary coil together as used herein means squeezing the primary coil and the secondary coil together but does not require that the primary coil and the secondary coil actually touch each other (e.g, (there may or may not be another structure disposed between the two coils such as an insulating shroud). Similarly, compressing two coils together as used herein does not require a reduction in the size or volume of either coil.

While the present invention will be illustrated with reference to a particular electrical transformer configuration having particular features, the present invention is not limited to this configuration or to these features and other configurations and features can be used. Similarly, while the present invention will be illustrated with reference to a battery charging power supply having a particular configuration and particular features, other battery charging and non-battery charging power supplies having other configurations and features can also be used. Finally, the present invention is also not limited to use in power supplies, but rather can be used in other non-power supply applications as well.

Numerous modifications may be made to the present invention which still fall within the intended scope hereof. Thus, it should be apparent that there has been provided in accordance with the present invention an electrical transformer for use in a battery charger-type power supply that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. A daisy chained battery charging system for charging a plurality of vehicle batteries, the charging system comprising:
    a plurality of power supplies, each power supply electrically coupled in a daisy chain configuration and each power supply sharing a common input power, each power supply including a high-frequency transformer, and each power supply configured to deliver a DC battery charging power to charge at least one vehicle battery;
    each power supply including a wind tunnel, the wind tunnel formed by a first end and a second end coupled to a base, an L-shaped assembly coupled to at least one of the first end, the second end, and the base, and a side coupled to at least one of the first end, the second end, and the base;
    the high-frequency transformer positioned within the wind tunnel of each power supply including:
    a bobbin including an elongated top and bottom surfaces and first and second substantially semi-circular end surfaces connecting the top surface with the bottom surface to form an elongated first coil winding surface having a central axis;
    a first coil wound around the first coil winding surface; and
    a second coil magnetically coupled to the first coil and wound thereto.

2. The battery charging system of claim 1, wherein the high-frequency transformer further includes an insulating shroud disposed between the first coil and the second coil, wherein the insulating shroud includes elongated top and bottom surfaces and first and second substantially semi-circular end surfaces connecting the top surface of the insulating shroud with the bottom surface of the insulating shroud to form a second coil winding surface, and further wherein the second coil is wound around the second coil winding surface.

3. The battery charging system of claim 2, wherein the second coil includes a plurality of second coil turns and further wherein the high-frequency transformer includes a plurality of locating bosses disposed on the second coil winding surface to maintain each of the plurality of second coil turns in a desired location.

4. The battery charging system of claim 1, wherein the high-frequency transformer further includes an insulating shroud disposed between the first coil and the second coil, wherein the insulating shroud includes a second coil winding surface and first and second insulating shroud sidewalls each disposed along opposite sides of the second coil winding surface, wherein the second coil winding surface substantially conforms to the shape of the first coil, and further wherein the second coil is wound around the second coil winding surface between the first and second insulating shroud sidewalls.

5. The battery charging system of claim 1, wherein the bobbin includes a central opening disposed inside of the first coil winding surface and further wherein the high-frequency transformer includes a magnetic core disposed in the central opening wherein the magnetic core has a rectangular cross-section immediately adjacent one of the first or second substantially semi-circular end surfaces.

6. The battery charging system of claim 1, wherein the second coil includes a plurality of second coil turns, and further wherein the high-frequency transformer includes a plurality of locating spacers disposed to maintain a desired spacing between each of the plurality of second coil turns.

7. The battery charging system of claim 6, wherein the plurality of locating spacers are disposed such that there is at least one locating spacer between each second coil turn.

8. The battery charging system of claim 1, wherein the bobbin further includes first and second bobbin sidewalls each disposed along opposite sides of the first coil winding surface to form a winding window, and further wherein the bobbin includes first and second wire exits adjacent to and in open communication with the winding window, and further wherein the first coil includes a first lead end exiting the winding window through the first wire exit and a second lead end exiting the winding window through the second wire exit such that the first lead end and the second lead end exit the bobbin in a direction that is substantially perpendicular to the central axis.

9. The battery charging system of claim 1, wherein the second coil is wound concentric to the first coil, and further wherein the high-frequency transformer includes a cover disposed such that the first coil and the second coil are compressed between the first coil winding surface and the cover.

10. A vehicle battery charging and monitoring system, comprising:
a power supply including a high-frequency transformer and configured to deliver a direct current battery charging power to charge a vehicle battery;
a battery module simultaneously carried by and connected to the vehicle battery, the battery module to provide control and monitoring of the vehicle battery to assess the vehicle battery health, the charging process, charging and discharging history, and fleet operations data;
a wind tunnel, the wind tunnel formed by a first end and a second end coupled to a base, an L-shaped assembly coupled to at least one of the first end, the second end, and the base, and a side coupled to at least one of the first end, the second end, and the base;
the high-frequency transformer positioned within the wind tunnel and having:
a bobbin having a first coil winding surface;
a first coil wound around the first coil winding surface;
a second coil wound concentric to the first coil; and
a cover, wherein the first coil and the second coil are compressed between the first coil winding surface and the cover.

11. The battery charging system of claim 10, wherein the transformer further includes a plurality of compression bosses wherein each of the plurality of compression bosses contacts one of the first or second coils to compress the first coil and the second coil between the first coil winding surface and the cover.

12. The battery charging system of claim 11, wherein at least one of the plurality of compression bosses is located on at least one of the cover and the first coil winding surface.

13. The battery charging system of claim 10, wherein the second coil is disposed on the outside of the first coil.

14. The battery charging system of claim 10, further including an insulating shroud disposed between the first coil and the second coil.

15. A daisy chained battery charging system for charging at least one vehicle battery, the system comprising:
a plurality of power supplies, each of the plurality of power supplies being electrically coupled in a daisy chain configuration and each of the plurality of power supplies sharing a common input power, each of the plurality of power supplies including a high-frequency transformer, each of the plurality of power supplies configured to deliver a DC battery charging power to charge the at least one vehicle battery;
a battery module carried by and connected to at least one of the at least one vehicle battery, the battery module to provide control and monitoring of the at least one vehicle battery to assess vehicle fleet operations data;
each of the plurality of power supplies including a wind tunnel, the wind tunnel formed by a first end and a second end coupled to a base, an L-shaped assembly coupled to at least one of the first end, the second end, and the base, and a side coupled to at least one of the first end, the second end, and the base;
the high frequency transformer positioned within the wind tunnel and having:
a first coil;
a second coil magnetically coupled to the first coil, the second coil including a plurality of second coil turns; and
a plurality of locating spacers disposed to maintain a desired spacing between each of the plurality of second coil turns; and
at least one battery charging cable extending from the power supply, the at least one battery charging cable including a connector for coupling to the battery within the vehicle.

16. The battery charging system of claim 15, wherein each of the plurality of locating spacers is disposed such that there is one locating spacer between each second coil turn.

17. The battery charging system of claim 15, wherein the plurality of locating spacers are disposed such that there is one locating spacer on each side of each of the plurality of second coil turns.

18. A method of manufacturing a vehicle battery charging system, the method comprising the steps of:
constructing a vehicle battery charging power supply including electrical connections for receiving a high-frequency transformer;

forming a wind tunnel, the wind tunnel formed by coupling a first end and a second end to a base, coupling an L-shaped assembly to at least one of the first end, the second end, and the base, and coupling a side to at least one of the first end, the second end, and the base;

forming the high-frequency transformer by:

providing a first coil;

winding a second coil concentric to the first coil;

compressing the first coil and the second coil together to reduce the leakage inductance between the first coil and the second coil to a desired value;

mounting the high-frequency transformer within the wind tunnel and to the vehicle battery charging power supply through the electrical connections, such that the vehicle battery charging power supply is configured to deliver a DC battery charging power to charge at least one vehicle battery; and providing a battery module to be simultaneously carried by and connected to the vehicle battery, the battery module providing control and monitoring of the vehicle battery and assessing the vehicle battery health, the charging process, charging and discharging history, and vehicle fleet operations data.

19. The method of claim 18, wherein the winding step includes the substep of mounting the first coil and the second coil to a bobbin.

20. The battery charging system of claim 1, wherein the power supply includes an input circuit to receive an input signal from a source of power and provide an output signal to the high frequency transformer, and an output circuit to receive an input signal from the transformer and provide the DC battery charging power to charge the at least one vehicle battery.

* * * * *